US010934835B2

(12) United States Patent
Deville et al.

(10) Patent No.: US 10,934,835 B2
(45) Date of Patent: Mar. 2, 2021

(54) CHEMICALLY TAGGED DRILLING FLUID ADDITIVES

(71) Applicant: Halliburton Energy Services, Inc., Houston, TX (US)

(72) Inventors: Jay Paul Deville, Spring, TX (US); William Walter Shumway, Spring, TX (US); Adam R. Dotson, Houston, TX (US); Kevin Gregory Kleinguetl, Kingwood, TX (US); Brice Aaron Jackson, Houston, TX (US); Lawrence Joseph Herskowitz, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/480,636

(22) PCT Filed: Dec. 22, 2017

(86) PCT No.: PCT/US2017/068137
§ 371 (c)(1),
(2) Date: Jul. 24, 2019

(87) PCT Pub. No.: WO2018/160259
PCT Pub. Date: Sep. 7, 2018

(65) Prior Publication Data
US 2019/0360326 A1 Nov. 28, 2019

Related U.S. Application Data

(60) Provisional application No. 62/466,825, filed on Mar. 3, 2017, provisional application No. 62/466,436, filed on Mar. 3, 2017.

(51) Int. Cl.
*E21B 47/11* (2012.01)
*C09K 8/03* (2006.01)
(Continued)

(52) U.S. Cl.
CPC ............... *E21B 47/11* (2020.05); *C09K 8/03* (2013.01); *E21B 21/003* (2013.01);
(Continued)

(58) Field of Classification Search
CPC .............................. E21B 47/11; E21B 47/111
See application file for complete search history.

(56) References Cited

U.S. PATENT DOCUMENTS

| 5,013,522 A | 5/1991 | Granath et al. |
| 6,176,323 B1 | 1/2001 | Weirich et al. |

(Continued)

FOREIGN PATENT DOCUMENTS

| CN | 104132918 | 11/2014 |
| CN | 103364427 | 1/2016 |
| CN | 104024573 | 5/2018 |

OTHER PUBLICATIONS

ISRWO International Search Report and Written Opinion for PCT/US2017/068137 dated Apr. 16, 2018.
(Continued)

*Primary Examiner* — Kristyn A Hall
(74) *Attorney, Agent, or Firm* — Tenley Krueger; C. Tumey Law Group PLLC (57) ABSTRACT

A method, system, and apparatus for using and testing chemically tagged drilling fluid additives. In one embodiment, the method comprises: circulating a drilling fluid in a wellbore, wherein the drilling fluid comprises a chemically tagged drilling fluid additive; and extending the wellbore into one or more subterranean formations while circulating the drilling fluid. A system comprising: a drilling fluid comprising a chemically tagged drilling fluid additive; a drill string comprises a drill bit and a downhole tool; a data processing system operable to receive measurements from the downhole tool to produce a visual representation of the (Continued)

chemically tagged drilling fluid additive in a subterranean formation or a filter cake. An apparatus comprising: a vessel for holding a quantity of a drilling fluid a filter media; a mud sensor; a cake sensor; an outlet sensor; a data processing system coupled to the mud sensor, the cake sensor, and the outlet sensor.

21 Claims, 5 Drawing Sheets

(51) Int. Cl.
    *E21B 21/00*     (2006.01)
    *E21B 21/06*     (2006.01)
    *E21B 49/08*     (2006.01)
    *G01N 21/64*     (2006.01)

(52) U.S. Cl.
    CPC ............ *E21B 21/062* (2013.01); *E21B 49/08* (2013.01); *G01N 21/643* (2013.01); *G01N 2021/6439* (2013.01)

(56) References Cited

U.S. PATENT DOCUMENTS

| | | | |
|---|---|---|---|
| 8,409,509 | B2 | 4/2013 | Srienc et al. |
| 8,413,429 | B2 | 4/2013 | Gioannini et al. |
| 9,388,332 | B2 | 7/2016 | Deville et al. |
| 2004/0098202 | A1 | 5/2004 | McNeil, III et al. |
| 2005/0109087 | A1 | 5/2005 | Robb et al. |
| 2005/0109983 | A1 | 5/2005 | Pai-Paranjape et al. |
| 2009/0087912 | A1 | 4/2009 | Ramos et al. |
| 2014/0116778 | A1 | 5/2014 | Deville et al. |
| 2016/0046854 | A1 | 2/2016 | Gordon et al. |
| 2017/0350236 | A1* | 12/2017 | Shen ................. E21B 43/14 |

OTHER PUBLICATIONS

Chinese Office Action with Partial English Translation for Application No. 2017800849975 dated Dec. 31, 2020.

* cited by examiner

CHEMICALLY TAGGED DRILLING FLUID ADDITIVES

BACKGROUND

A drilling fluid is a specially designed fluid that is circulated through a wellbore as the wellbore is being drilled to facilitate the drilling operation. Drilling fluids may also be referred to as a "drilling mud." The various functions of a drilling fluid may include removing drill cuttings from the wellbore, cooling and lubricating the drill bit, aiding in support of the drill pipe and drill bit and/or providing a hydrostatic head to maintain the integrity of the wellbore walls, and prevent well blowouts. Specific drilling fluids, which can be oil-based or aqueous-based, may be selected to optimize a drilling operation in accordance with the characteristics of a particular geological formation.

Drilling fluids may include a number of different additives. The drilling fluid additives may provide a number of functions. To minimize the loss of drilling fluids into the formation, components in the drilling fluid, such as clays, fillers and lost circulation materials, are used to restrict flow of the drilling fluids into the formation and to form a filter cake at the wellbore wall. It is common for a drilling fluid to include a weighting material, or weighting agent, to increase the density of the drilling fluid. Drilling fluids often contain filtration control additives to inhibit or prevent loss of the drilling fluid into a permeable formation. With the multitude of ingredients that may include a drilling fluid and the ongoing changes that occur due to fluid losses and degradation it may extremely difficult to quantify the individual drilling fluid additives within the drilling fluid. Analysis, techniques and methods are known in the art that rely on monitoring changes in properties, such as density, resistivity and optical methods, but these only give rough approximations of values, often with the assumption that there is no contamination altering the results, and do not give individual analysis of drilling fluid additives. It may also be difficult to identify which of the lost circulation materials (or other drilling fluid additives) are in the filter cake.

In addition, drilling fluid additives that may be lost into the formation may interfere with testing that may be performed on produced formation fluids. By way of example, a produced formation fluid may include a mixture of any number of the fluids present in the formation as well as chemicals and fluids that were introduced into the formation during the drilling phase. In many instances it may be advantageous to take samples of a produced formation fluid to test it for various properties. Testing results from produced formation fluids contaminated with drilling fluids and drilling fluid additives may produce skewed results. Oftentimes the drilling fluid additives may not easily separate from the produced formation fluids and the signals produced by the drilling fluid additives may not be easily distinguished from the signals produced by the reservoir fluids.

BRIEF DESCRIPTION OF THE DRAWINGS

For a detailed description of the preferred embodiments of the invention, reference will now be made to the accompanying drawings in which.

DETAILED DESCRIPTION

The present disclosure relates generally to wellbore drilling operations. More particularly, the present invention relates to a method of quantification of drilling fluid additives which can lead to improved maintenance of drilling fluids. This method is applicable to both surface analysis and also can be integrated into downhole tools such as wireline tools and logging while drilling (LWD) or measurement while drilling (MWD) tools, well formation testing tools, drill-stem testing, as well as any other tool capable of being used in a downhole environment.

As disclosed herein, drilling fluid additives may be chemically modified to yield characteristic signatures which will allow simplified quantification of the drilling fluid additives. As used herein, drilling fluid additives that undergo chemical modification to have an identifiable signature are referred to as "chemically tagged drilling fluid additives." Chemical modifications should be considered a chemical tag that has been covalently bonded to, or permanently incorporated into, the molecule of interest and not just the bulk solution. Chemically tagging can provide improved alternative to tracers because the chemical functionality that provides the characteristic signature will be covalently attached to the drilling fluid additive. This avoids the issues of sorption or removal of tracers and functional additives.

Drilling fluid additives may be chemically tagged by a variety of different methods. Chemically tagging drilling fluid additives may be more efficient than the currently used tracers because the chemical functionality that provides the characteristic signature will be covalently attached to the additive. This may avoid issues related to sorption or removal of tracers and functional additives. Chemically tagged drilling fluids undergo chemical modification that may be covalently, or permanently bonded modifications to label the molecule of interest and not just the bulk solution. The chemically tagged drilling fluid additive may include a chemical tag bonded to molecules of the drilling fluid additive. In the example, a chemically tagged drilling fluid additive may contain a drilling fluid additive and a chemical tag covalently bonded to the drilling fluid additive. In a nonlimiting example, more than one chemical tag may be covalently bonded to molecules of the drilling fluid additive. This is an example of chemically tagging a drilling fluid additive, however, there are other methods and materials for chemically bonding a chemical tag to a polymer may be used and the present disclosure is not limited to the given example. Depending on the drilling fluid additive, different techniques for chemical modification may be used. For example, if the drilling fluid additive includes a cellulosic lost circulation material (e.g., walnut shells), organic chemistry reactions may be used to react with hydroxyl groups on the cellulose, for example, to attach fluorescent groups. For solids such as calcium carbonate, silane chemistry may be used to attach the chemical tag. It is to be understood that "chemically tagged" disclosed herein, may also be referred to as "chemically modified." The two are intended to mean the same thing and may be interchangeable.

The amount of chemical tags incorporated into drilling fluid additives should be sufficient to enable an operator to detect the presence and determine the concentration of the tagged detectable additive in the drilling fluid, for example, by the UV-Vis spectrophotometer. For example, the amount of chemical tag in the drilling fluid additive may be in an amount ranging from about 0.0001 mol % to about 10 mol % based on total moles of the drilling fluid additive. Alternatively, the amount of chemical tag in the drilling fluid additive may be in an amount ranging from about 0.01 mol % to about 5 mol % based on total moles of the drilling fluid additive or in an amount ranging from about 0.1 mol % to about 2 mol % based on total moles of the drilling fluid additive.

An example of a suitable chemical tag may include fluorescent molecules. The fluorescent molecules may produce a spectrum that accurately measures the concentration of the chemically tagged drilling fluid additives and may not suffer interference from other components of the drilling fluid. Fluorescent molecules may be attached to the drilling fluid additive through a variety of reactions including esterification, amidation, silane chemistry, vinyl polymerization, Diels-Alder addition, Gringard addition, and nucleophilic substitution, among others. The fluorescently tagged drilling fluid additive should now have a characteristic fluorescence emission that can be used to readily quantify the concentration of the chemically tagged drilling fluid additive. Any suitable fluorescent compound may be used. Examples of suitable fluorescent compounds may include, but are not limited to, fluorescein, a fluorescein derivative, fluorescein o-acrylate, fluorescein o-methacrylate, fluorescein dimethacrylate, 3,8-dimethacryloyl ethidium bromide, methacyloxyethyl thiocarbamoyl rhodamine B, and 2'-(4-methacryloxyphenyl)-5-(4-methyl-1-piperazinyl)-2,5'-bibenzimidazolyl trihydrochloride, carboxynaphthofluorescein, boron-dipyrromethene (BODIPY) chromaphores, carboxytetramethylrhodamine, BIS (4-triethoxysilylpropyl-3-methoxy-phenyl)-1,6-heptane-3,5,-dione, 3-(2,4-dinitrophenylamino)propyl-triethoxysilane, 2-hydroxy-4-(3-methyldiethoxysilyl-propoxy)diphenyl ketone, N-(triethoxysilylpropyl)dansylamide5-dimethylamino-N-(3-triethoxysilylpropyl)-napthalene-1-sulfonamide and combinations thereof. A fluorescently tagged drilling fluid additive may have a characteristic fluorescence emission that can be used to readily quantify the concentration of the tagged drilling fluid additive.

Another example of a suitable chemical tag may include incorporation of a chemical isotope into the drilling fluid additive as the chemical tag. In some examples, the chemical tag may include a compound containing at least one of $^2D$, $^3T$, $^{13}C$, $^{15}N$, $^{18}O$, $^{31}P$ and $^{37}Cl$. In other examples, the chemical tag may include radio-labeled isotopes of at least one from the group consisting of C, N, O, F, Br and I. For example, radio-labeled isotopes include $^3T$, $^{11}C$, $^{13}N$, $^{15}O$, $^{18}F$, $^{76}Br$, $^{123}I$ and $^{124}I$. The chemical isotope may be identified by isotopic labeling. Isotopic labeling is a technique used to track the passage of an isotope, or an atom with a variation, through a reaction, metabolic pathway, or cell. The reactant may 'labeled' by replacing specific atoms by their isotope. The isotope may be radioactive or stable. In isotopic labeling, there are multiple ways to detect the presence of labeling isotopes; through their mass, vibrational mode, or radioactive decay. Mass spectrometry or nuclear magnetic resonance detects the difference in an isotope's mass, while infrared spectroscopy detects the difference in the isotope's vibrational modes. Accelerator mass spectrometry has also been used to detect low levels of radioactivity in samples but is infrequently used due to the expense of the equipment and the difficulty in sample preparation. The radioactive decay can be detected through an ionization chamber or autoradiographs of gels. Detection of radioactive isotopes may also be performed with liquid scintillation counting (LSC). LSC uses a photomultiplier tube to detect light emissions from the fluor; a fluor is a fluorescent molecule that undergoes excitation by the absorption of radiation and releases light when it relaxes to the ground state. The amount of light emitted by a specified amount of radioactive material can be directly correlated to the amount of radioactivity present. Scintillation-based methods are good for the detection of radiolabels both due to the sensitivity, and due to the difficulties in handling contamination from sample spillage inside an instrument such as an NMR spectrometer.

Any of these tagging methods may simplify quantification, discrete tests may be performed on the fluid returns at the surface or through real time testing. Real time testing may allow for higher levels of automation to be employed that may take the concentration information and use it to derive automated additive dosing and maintenance operations. The chemical tag may be detected by any suitable means of identification. For example, the chemical compound may be detected via infrared (IR) spectroscopy, Ultraviolet-Visible (UV-Vis) spectroscopy, mass spectroscopy, fluorescence spectroscopy, atomic absorption spectroscopy, atomic emission spectroscopy, electromagnetic spectroscopy (i.e. spectrophotometry), X-ray spectroscopy, plasma emission spectroscopy, visible absorption spectroscopy, near-infrared (NIR) spectroscopy, Raman spectroscopy, coherent anti-Stokes Raman spectroscopy (CARS), nuclear magnetic resonance, photoemission, Mössbauer spectroscopy, acoustic spectroscopy, laser spectroscopy, Fourier transform spectroscopy, Fourier transform infrared spectroscopy (FTIR) and the like.

In an embodiment utilizing optical sensors the light source may be selected from the group of a tunable source, a broadband source (BBC), a fiber amplified stimulated emission (ASE) source, black body radiation, enhanced black body radiation, a laser, infrared, a laser diode array, supercontinuum radiation, frequency combined radiation, fluorescence, phosphorescence, and terahertz radiation.

In an embodiment, the spectroscopy may be performed by a diffraction grating or optical filter, which allows may allow for the selection of different narrow-band wavelengths from a white light or broadband source. In an embodiment, a method of utilizing a broadband source may be in conjunction with Fiber Bragg Grating (FBG). FBG may include a narrow band reflection mirror whose wavelength may be controlled by the FBG fabrication process. In an embodiment, the broadband light source may be utilized in a fiber optic system. In an embodiment, the fiber optic system may contain a fiber having a plurality of FBGs. In such an embodiment, the broadband source may effectively be converted into a plurality of discrete sources having desired wavelengths.

In an embodiment, the spectroscopy of the present invention includes Fourier spectroscopy. Fourier spectroscopy, or Fourier transform spectroscopy, is a method of measurement for collecting spectra. In Fourier transform spectroscopy, rather than passing a monochromatic beam of light through a sample as in conventional IR spectroscopy, a beam containing multiple different frequencies of light may be passed through a sample. This spectroscopy method may then measure how much of the beam is absorbed by the sample. Next, the beam may be modified to contain a different combination of frequencies, giving a second data point. This process may be repeated many times. After the beams of light have been passed through the sample, the resultant data may be sent to a computer, which may infer from the data what the absorption is at each wavelength. In an embodiment, the beam described above may be generated by a broadband light source. The light emitted from the broadband light source shines into a designated configuration of mirrors, also known as an interferometer, that may allow some wavelengths to pass through but blocks others, due to wave interference. The beam may be modified for each new data point by moving one of the mirrors; this may change the set of wavelengths that pass through. As mentioned above, computer processing may be used to turn the raw data, which may include the light absorption for each mirror position into the desired result, which may include light adsorption for each wavelength. This processing may also be known as Fourier transform and the raw data may be referred to as the interferogram. When Fourier spectroscopy is utilized, a scanning process may be needed to create the interferogram. The spectrometer may internally generate a fixed and variable length path for the optical beam and then recombines these beams, thereby generating optical interference. The resulting signal may include summed interference pattern for all frequencies not absorbed by the sample. As a result, the measurement system may not be a one-shot type system, and hence a continuous or intermittent ampler-type system may be preferred for use with this type of spectrometer. In an embodiment, the Fourier spectroscopy may be performed utilizing any known light source.

As discussed above, drilling fluid additives may be chemically modified to yield characteristic signatures which may allow simplified quantification of the additives. Any of the previously discussed tagging methods may simplify quantification. Quantification of the drilling fluid additives may take place in tests at the surface, in real time, as well as downhole. It is possible, that the drilling fluid additives may be orthogonally tagged. Orthogonally tagged disclosed herein means that multiple additives within a drilling fluid may be tagged differently. This will allow an operator to analyze the effectiveness of different additives in one sample. These additives may be assessed side by side without interfering with one another. By way of example, the different additives may be tagged with a different flurophore, with each flurophore emitting light at different wavelengths. A fluorophore may be a fluorescent chemical compound that may re-emit light upon light excitation. Any suitable fluorophore may be used. A suitable fluorophore may include, but is not limited to, xanthene derivatives, cyanine derivatives, squaraine derivatives, naphthalene derivatives, coumarin derivatives, oxadiazole derivatives, anthracene derivatives, pyrene derivatives, oxazine derivatives, acridine derivatives, arylmethine derivatives, tetrapyrrole derivatives and or any combinations thereof. Different fluorophores may be identified by the wavelength they emit after light excitation. Wavelength emissions may range from about 400 nm to about 750 nm, or from about 400 nm to about 600 nm, or from about 600 nm to about 750 nm.

Any suitable drilling fluid additive may be chemically tagged as described herein. Suitable drilling fluid additives may include, but are not limited to, lost circulation materials, base oils, shale inhibitors, lubricants, and combinations thereof. Two or more different drilling fluid additives may be tagged in some instances. Those of ordinary skill in the art, with the benefit of this disclosure, should be able to selected, an appropriate drilling fluid additive for tagging.

Lost circulation materials may be one type of drilling fluid additive that can be tagged. Lost circulation materials are materials that are introduced into a drilling fluid to reduce and possibly prevent the flow of drilling fluids into a weak, fractured or vugular formation. Chemically tagging lost circulation materials may allow an operator to better determine the effectiveness of the lost circulation material. It may also aid an operator in adjusting the lost circulation material so that optimal results are achieved and less drilling fluid may be lost to the formation. A suitable lost circulation material may be natural or synthetic, degradable or nondegradable, particles or fibers, and mixtures thereof.

Suitable examples of materials for a lost circulation material may include, but are not limited to, sand, shale, ground marble, bauxite, ceramic materials, glass materials, metal pellets, high strength synthetic fibers, cellulose flakes, wood, resins polymer materials (crosslinked or otherwise), polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, composite particulates, and any combination thereof. Suitable composite particulates may include a binder and a filler material, wherein suitable filler materials may include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The lost circulation material may be present in a drilling fluid in any suitable amount, including but not limited to, about 1 wt. % to about 40 wt. % based on total weight of the drilling fluid. Alternatively, the lost circulation material may be present in an amount about 1 wt. % to about 30 wt. % or about 10 wt. % to about 30 wt. % based on total weight of the drilling fluid. For example, the lost circulation material may be present in the drilling fluid in an amount of about 5 wt. %, about 10 wt. %, about 20 wt. %, about 25 wt. %, or about 30 wt. %, based on a total weight of the drilling fluid.

Furthermore, different sizes of lost circulation materials may be used. For example, the lost circulation material may include two, three, of four lost circulation materials of different sizes. By way of example, the lost circulation materials may include particles with a size distribution ranging from about 2 µm to about 1,500 µm. For example, the lost circulation material may have a particle size distribution of about 5 µm, or about 25 µm, or about 50 µm, or about 100 µm, or about 400 µm, or about 600 µm, or about 1,000 µm. In such examples, the different sized lost circulation materials may be tagged with different chemical tags to enable independent quantification. For example, each size of lost circulation material present may be tagged with a different fluorescent color.

Base oil may be another type of drilling fluid additive that may be chemically tagged. The base oil may be the continuous phase of an oil-based drilling fluid, in which the drilling fluid may be a water-in-oil emulsion with water as the dispersed phase and the base oil as the continuous phase. Any suitable base oil may be used in the drilling fluid, including, but not limited to, a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil includes diesel oil. The saturated hydrocarbon can be an alkane or paraffin. For example, the saturated hydrocarbon may include an isoalkane, a linear alkane, or a cyclic alkane. Examples of suitable saturated hydrocarbons may include a combination of an isoalkane and an n-alkane or a mineral oil blend that includes alkanes and cyclic alkanes. The unsaturated hydrocarbon may include an alkene, alkyne, or aromatic. The alkene may include an isoalkene, linear alkene, or cyclic alkene. The linear alkene may include a linear alpha olefin or an internal olefin. The base oil may be present in a drilling fluid in an any suitable amount, including an amount ranging from about 1 wt. % to about 90 wt. %, about 30 wt. % to about 80 wt. % or about 50 wt. % to about 70 wt. % based on a total weight of the drilling fluid. For example, the base oil may be present in the drilling fluid in an amount of about 10 wt. %, about 20 wt. %, about 30 wt. %, about 40 wt. %, about 50 wt. %, about 60 wt. %, about 70 wt. %, about 80 wt. %, or about 90 wt. %, based on a total weight of the drilling fluid.

Shale inhibitors may be another type of drilling fluid additive that can be chemically tagged. A shale inhibitor may be used to slow the hydration, swelling and disintegration of shales. Examples of suitable shale inhibitors may include, but are not limited to, amines, glycols, polyacrylamides, partially hydrolyzed polyacrylamides, polyvinylpyrollidones, polyvinylalcohols, and or any combination thereof. The shale inhibitor may be present in a drilling fluid in an any suitable amount, including an amount ranging from about 0.1 wt. % to about 5 wt. % based on a total weight of the drilling fluid, including, but not limited to about 0.1 wt. %, about 1 wt. %, about 2 wt. %, about 3 wt. %, about 4 wt. %, or about 5 wt. %.

Lubricants may be another type of drilling fluid additive that can be chemically tagged. A lubricant may be used to lower torque (rotary friction) and drag (axial friction) in the wellbore as well as lubricate bit bearings if they are not sealed. Examples of suitable lubricants may include, but are not limited to vegetable oils, olefins, phosphonates, esters, glycols, glass beads, and or any combination thereof. The lubricant may be present in a drilling fluid in an any suitable amount, including an amount ranging from about 1 wt. % to about 10 wt. % based on a total weight of the drilling fluid. Alternatively, the lubricant may be present in a drilling fluid in an amount ranging from about 1 wt. % to about 4 wt. % or from about 5 wt. % to about 8 wt. % based on a total weight of the drilling fluid.

A drilling fluid may be prepared that includes a chemically tagged drilling fluid additive. A drilling fluid may be used in the drilling of a wellbore and it may serve a number of purposes, such as cooling of the drill bit, carrying cuttings to the surface, provide pressure to maintain wellbore stability and prevent blowouts and/or the sealing off of the wellbore. A suitable drilling fluid may include oil-based fluids and aqueous-based fluids. Suitable oil-based fluids may include a base oil, such as those described above. The base oil may be the continuous phase of an oil-based drilling fluid, in which the drilling fluid may be a water-in-oil emulsion with water as the dispersed phase and the base oil as the continuous phase. Suitable aqueous-based fluids may include fresh water, saltwater (e.g., water containing one or more salts dissolved therein), brine (e.g., saturated salt water), seawater, and any combinations thereof.

Drilling fluids may also include any of a variety of drilling fluid additives that are commonly used in oil field applications, as known to those skilled in the art. These may include, but are not necessarily limited to, base oils, salts, shale inhibitors, lubricants, surfactants (e.g., foamer, defoamer, wetting agent, detergent, and corrosion inhibitor), water softeners (e.g., sodium carbonate), oxygen scavengers, biocides, pH adjusters, fluid loss control agents, viscosity increasing agents, weighting agents (other than salt), lost circulation materials, and corrosion inhibitors (other than surfactant) and combinations thereof. As previously described, one or more of these additives may be chemically tagged.

By chemically tagging drilling fluid additives, the chemically tagged drilling fluid additives may yield characteristic signatures which may allow for simplified quantification of the additives. Any of the above tagging methods may simplify quantification. Concentration of the chemically tagged drilling fluid additives may be monitored above surface, downhole, and or through real time testing. Discrete tests may be performed on fluid returns at the surface to determine the concentration of the chemically modified drilling fluid additive. Real time testing downhole may be performed and may allow for higher levels of automation to be employed that may take the concentration information and use it to drive automated additive dosing and maintenance operations. Real time formulation information may be used to develop an automated fluid routing system for diversion of fluids of different origin (i.e. separation of wellbore treatment fluids from native formation fluids).

One technique for determining the concentration of the chemically tagged drilling fluid additive in the drilling fluid will now be described. A sample of the drilling fluid may be obtained. This drilling fluid may be analyzed in the well or at the surface. For example, the analysis could be UV-Vis spectroscopy. The information obtained from the analysis, for example, the UV-Vis spectrographic data, can then be relayed to an operator at the site or at an offsite location. The operator may then evaluate the concentration of the chemically tagged drilling fluid additive based on the spectrographic data. Then, the operator may then make a decision to add more chemically tagged drilling fluid additive to the drilling fluid based on the data.

A UV-Vis calibration curve of the return drilling fluid may be obtained by measuring a UV-Vis spectrum of at least two different concentrations of chemically tagged drilling fluid additives in the drilling fluid to determine the concentration of the chemically tagged drilling fluid additive. In other embodiments, to improve the accuracy of the calibration curve, more than two concentrations of chemically tagged drilling fluid additives may be used.

The at least two different concentrations of chemically tagged drilling fluid additives should be known before measuring, so that a relationship between the concentration of the chemically tagged drilling fluid additive and the UV-Vis spectrum may be obtained. To build a calibration curve the absorption spectra for different concentrations of a solution of the same chemically tagged drilling fluid additives are recorded; the intensity of absorption bands (the absorbance) at the point of maximum absorption, or $\lambda_{max}$, of at least one of the absorption bands is determined and then is plotted the absorbance (maximum of absorption) versus concentration $A=f(c)$. Once the calibration curve is obtained, the concentration of chemically tagged drilling fluid additive in the sample may then be determined by comparing the sample to the calibration curve.

The calibration curve may be made offsite or onsite. As long as the calibration curve can be used to accurately determine the concentration of chemically tagged drilling fluid additive in the return drilling fluid, the location at which the calibration curve is created is optional. However, in some examples, it may be useful to obtain a calibration curve onsite to allow a wellbore operator to obtain a calibration curve of the same batch of chemically tagged drilling fluid additive used down well.

To obtain UV-Vis spectra, a UV-Vis spectrophotometer may be used. A UV-Vis spectrophotometer measures the amount of light absorbed at each wavelength of the UV and visible regions of the electromagnetic spectrum. In a conventional UV-Vis spectrophotometer, a beam of light is split; one half of the beam (the sample beam) is directed through a cell containing the sample. The cell must be transparent to UV and visible light in order to prevent absorption of the beam by the cell. The other half of the beam (the reference beam) is directed through an identical cell that does not contain the compound but only the solvent.

In other examples, back-scatter methods of detection may be used to detect the chemically tagged drilling fluid additive. Back-scatter methods allow for quantification of components when fluids are opaque and therefore prevent the transmission of light in the UV-Vis range. Front-surface fluorescence and backscattering probes are readily available and allow easy quantification of fluorescence in the field. As above, the concentration is determined either in the well, on the drill site near the well, or in an offsite location.

A fiber optic probe coupled to the spectrophotometer and a light source could be used to detect the chemical tag in the detectable polymer.

In certain examples of the present disclosure, the UV-Vis spectrum of the chemical tag exhibits a $\lambda_{max}$ the range of 400 nm to 750 nm. For example, a UV-Vis spectrum of the chemical tag exhibits a $\lambda_{max}$ may be in the range of 600 nm to 750 nm or from 400 to 550 nm. These ranges are chosen to avoid measuring absorbance spectra near the UV range, which may have a great deal of interference from other components of the drilling fluid.

Figure 1:
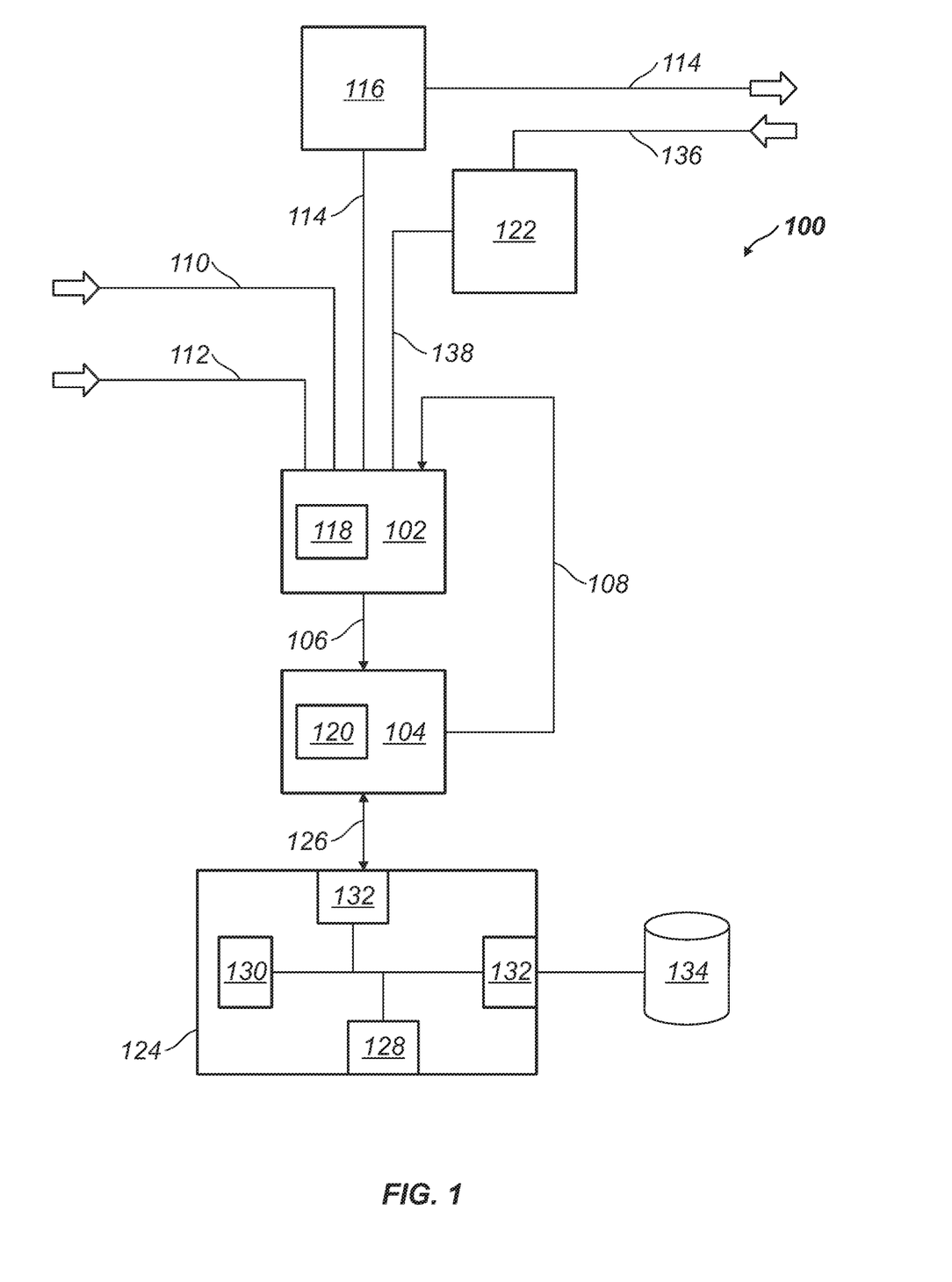
FIG. 1 illustrates a block diagram of a drilling fluid monitoring and handling system for determining concentration of one or more components of drilling fluids.

In other examples of the present disclosure, the chemically tagged drilling fluid additive may also be identified by isotopic labeling. Isotopic labeling is a technique used to track the passage of an isotope, or an atom with a variation, through a reaction, metabolic pathway, or cell. In isotopic labeling, there are multiple ways to detect the presence of labeling isotopes; through their mass, vibrational mode, or radioactive decay. Mass spectrometry or nuclear magnetic resonance detects the difference in an isotope's mass, while infrared spectroscopy detects the difference in the isotope's vibrational modes. Accelerator mass spectrometry has also been used to detect low levels of radioactivity in samples but is infrequently used due to the expense of the equipment and the difficulty in sample preparation. The concentration of the chemically tagged drilling fluid additive with the radio-isotope may be determined in a similar manner as that containing fluorescent compound. The method includes obtaining a calibration curve by measuring the radio-isotope or radio-isotopes for at least two different concentrations of the chemically tagged drilling additive in the drilling fluid. Then, the concentration of the sample is determined by comparing the amount of radio-isotope in the sample to the calibration curve. FIG. 1 illustrates a block diagram of a drilling fluid monitoring and handling system 100 for determining the concentration of one or more components of drilling fluids. As illustrated, the fluid monitoring and handling system 100 may generally include a mud pit 102 and a fluid analysis system 104. A portion of the drilling fluid from the mud pit 102 may be fed via a mud pit line 106 to the fluid analysis system 104, which may be configured to perform measurements on the portion of the drilling fluid supplied thereto. The fluid analysis system 104 may analyze the drilling fluid using any suitable analysis technique. After fluid analysis, the portion of the drilling fluid may be returned to mud pit 102 via a return line 108.

The mud pit 102 may be any vessel suitable for holding a drilling fluid. For example, the mud pit 102 may include a container such as a drum or tank, or a series of containers that may or may not be connected. The mud pit 102 may be supplied with the drilling fluid from an initial drilling fluid supply line 110 that provides an initial supply of drilling fluid to the mud pit 102. However, the initial supply of drilling fluid does not imply that the drilling fluid has not been recycled or circulated in a wellbore, but simply indicates that this supply is not presently being circulated or otherwise used in the wellbore.

Drilling fluid additives may be chemically tagged and then they may be added to the drilling fluid. The drilling fluid additives may be chemically tagged with a chemical tag or a plurality of chemical tags using any suitable method. In a non-limiting example, chemical tags may include fluorescent molecules, atoms with a characteristic signature in mass spectrometry, magnetic particles, quantum dots, fluorescent nanoparticles, fluorophore, and or any combination thereof. Chemical tags may the covalently bonded to the drilling fluid additive by any suitable method. Chemically tagged drilling fluid additives may be added via a drilling fluid additive supply line 112 to the mud pit 102, if desired, and based on the analysis provided by the fluid analysis system 104. Any suitable chemically tagged drilling fluid additives may be used. Suitable chemically tagged drilling fluid additives may include, but are not limited to, base oils, shale inhibitors, lubricants, lost circulation materials, and or any combination thereof. Alternatively or additionally, in an example, the results of the analysis may be used to modify the manufacturing process of the drilling fluid. After the drilling fluid additives have been added to the drilling fluid, the drilling fluid may be retested using the fluid analysis system 104 to verify the drilling fluid was correctly formulated or the drilling fluid may be sent to the wellbore for use in drilling operations via a wellbore line 114 by way of mud pump 116.

The mud pit 102 may include a mixing system 118 to mix the contents of the mud pit 102 as well as any drilling fluid additives. For instance, the mixing system 118 may mix the drilling fluid in the mud pit 102 with drilling fluid from the initial drilling fluid supply line 110, drilling fluid from the return line 108, chemically tagged drilling fluid additives, additional non-aqueous fluids, aqueous fluids or combinations thereof. In general, the mixing system 118 may be configured to prevent solids within the drilling fluid from settling. The mixing system 118 may use any suitable mixing technique for mixing of the drilling fluid. For instance, the mixing system 118 may include a static mixer, dynamic mixer, or other suitable mixer. The mud pit 102 may further include suitable pumping equipment (not shown) t to pump the drilling fluid in the mud pit 102 to the fluid analysis system 104 via mud pit line 106.

The fluid analysis system 104 may analyze the portion of the drilling fluid in a continuous or non-continuous manner, as desired, and based on whether flow through fluid analysis system 104 is continuous or non-continuous. The drilling fluid may include a chemically tagged drilling fluid additive. The fluid analysis system 104 may include one or more instruments 120 for measuring the concentration of the drilling fluid while applying a variety of techniques to the drilling fluid. For example, the instrument(s) 120 may include a fluorescence analyzer, optical analyzer, a mass spectrometer, a magnetic sensor, an electron paramagnetic resonance spectrometer, or a NMR spectrometer.

Although the fluid analysis system 104 is shown at the mud pit 102, examples disclosed herein contemplate the placement of fluid analysis system 104 at any point in the fluid monitoring and handling system 100. For example, one or more instruments 120 of the fluid analysis system 104 may alternatively be placed in a fluid reconditioning system 122 (discussed below), the mud pit 102, as well as within the wellbore or in an exit conduit from the wellbore. As such, examples disclosed herein contemplate measuring the concentration while applying a variety of techniques at any point in the drilling fluid handling process, so that the drilling fluid may be monitored and/or subsequently adjusted as desired. Some techniques may include the use of a fluorescence analyzer. A fluorescence analyzer utilizes a beam of light to excite the electrons in molecules of certain compounds which causes them to emit light. Another technique may include the use of an optical analyzer. An optical analyzer (i.e. a spectrometer) may measure the properties of light over a specific portion of the electromagnetic spectrum. Another technique may include the use of a mass spectrometer. A mass spectrometer ionizes chemical species and sorts the ions based on their mass-to-charge ratio. In addition, the technique may include a spectrophotometric method. A spectrophotometric method may include taking a quantitative measurement of the reflection or transmission properties of a material as a function of wavelength. This method may utilize visible light, near-ultraviolet light, and or near-infrared light. Any other suitable technique or method may be used alone, or in combination with another technique or method.

The analysis performed by fluid analysis system 104 may be performed in collaboration with a computer system 124 communicably coupled thereto. As illustrated, the computer system 124 may be an external component of the fluid analysis system 104, however, the computer system 124 may alternatively include an internal component of the fluid analysis system 104, without departing from the scope of the disclosure. The computer system 124 may be connected to the fluid analysis system 104 via a communication link 126. The communication link 126 may include a direct (wired) connection, a private network, a virtual private network, a local area network, a WAN (e.g., an Internet-based communication system), a wireless communication system (e.g., a satellite communication system, telephones), any combination thereof, or any other suitable communication link.

The computer system 124 may be any suitable data processing system including, but not limited to, a computer, a handheld device, or any other suitable device. The computer system 124 may include a processor 128 and a non-transitory computer readable storage medium 130 communicatively coupled to the processor 128. The processor 128 may include one central processing unit or may be distributed across one or more processors in one or more locations. Examples of a non-transitory computer readable storage medium 130 include random-access memory (RAM) devices, read-only memory (ROM) devices, optical devices (e.g., CDs or DVDs), disk drives, and the like. The non-transitory computer readable storage medium 130 may store computer readable program code that may be executed by the processor 128 to process and analyze the measurement data generated by fluid analysis system 104, adjust the parameters of the fluid monitoring and handling system 100, and/or operate a part or whole of the fluid monitoring and handling system 100. Further, from the concentration measurements of the drilling fluid measured by the fluid analysis system 104 while an electric field is applied, the program code may be executed by the processor 128 to determine concentration of one or more drilling fluid additives in the drilling fluid. The concentration may be determined, for example, using a correlation developed between the properties analyzed. More than one drilling fluid may be analyzed at the same time. The chemically tagged drilling fluid additives may be orthogonally tagged, this means that the chemically tagged drilling fluid additives are tagged in such a way, that they do not interfere with one another.

The computer system 124 may further include one or more input/output ("I/O") interface(s) 132 communicatively coupled to the processor 128. The I/O interface(s) 132 may be any suitable system for connecting the computer system 124 to a communication link, such as a direct connection, a private network, a virtual private network, a local area network, a wide area network ("WAN"), a wireless communication system, or combinations thereof; a storage device, such as storage 134; an external device, such as a keyboard, a monitor, a printer, a voice recognition device, or a mouse; or any other suitable system. The storage 134 may store data required by the fluid analysis system 104 for performing fluid analysis. For instance, the storage 134 may store a collection of equivalent circuit models that may be used during the EIS analysis. The storage 134 may be or include compact disc drives, floppy drives, hard disks, flash memory, solid-state drives, and the like. Those of ordinary skill in the art will appreciate that suitable data processing systems may include additional, fewer, and/or different components than those described for computer system 124.

Data processing and analysis software native to the fluid analysis system 104 and/or installed on the computer system 124 may be used to analyze the data generated by fluid analysis system 104. This procedure may be automated such that the analysis happens without the need for operator input or control. Further, the operator may select from several previously input parameters or may be able to recall previously measured data. Any of the data may be transferred and/or stored on an external memory device (e.g., a USB drive), if desired.

With continued reference to FIG. 1, the drilling fluid may be delivered to a wellbore from mud pit 102 by way of mud pump 116 via wellbore line 114. The mud pump 116 may be any type of pump or pumping system useful for circulating a drilling fluid into a subterranean formation under a sufficient pressure. The drilling fluid that has been circulated within the wellbore may be returned to the mud pit 102 via a circulated drilling fluid return line 136 and provided to a fluid reconditioning system 122 to condition the circulated drilling fluid prior to returning it to the mud pit 102. The fluid reconditioning system 122 may be or include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid reconditioning system 122 may further include one or more sensors, gauges, pumps, compressors, and the like used to monitor, regulate, and/or recondition the drilling fluid and various additives added thereto. After the drilling fluid has been reconditioned, the drilling fluid may be returned to the mud pit 102 via the reconditioned fluid line.

Figure 2:
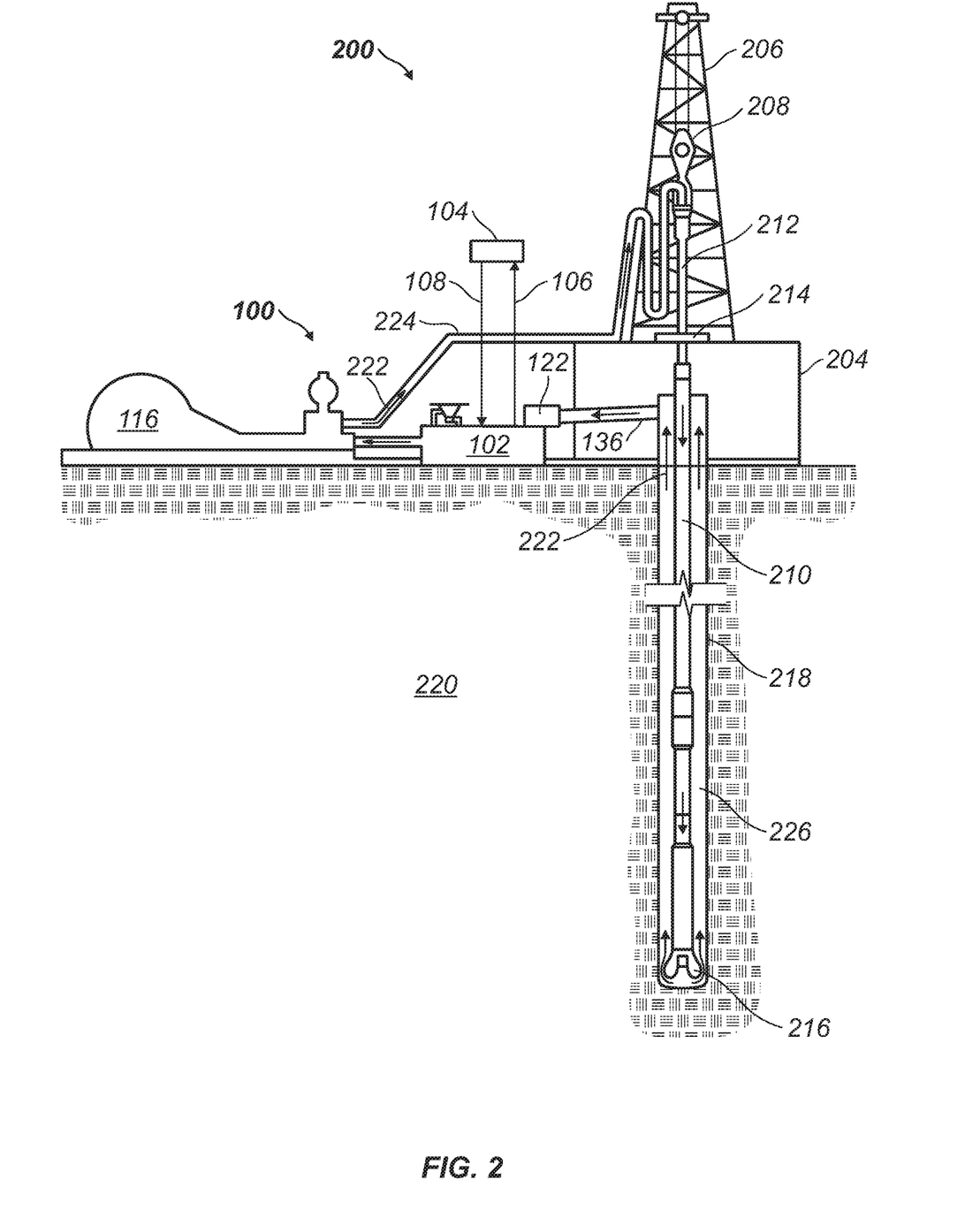
FIG. 2 illustrates an example of a drilling assembly that may employ the fluid monitoring and handling system of FIG. 1 to determine concentration of one or more drilling fluid additives.

FIG. 2 illustrates an example of a drilling assembly 200 that may employ the fluid monitoring and handling system 100 of FIG. 1 described herein to determine the concentration of one or more drilling fluid additives. It should be noted that while FIG. 2 generally depicts a land-based drilling system, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 204 that supports a derrick 206 having a traveling block 208 for raising and lowering a drill string 210. The drill string 210 may include, but is not limited to, drill pipe and coiled tubing, as generally known to those skilled in the art. A kelly 212 may support the drill string 210 as it may be lowered through a rotary table 214. A drill bit 216 may be attached to the distal end of the drill string 210 and may be driven either by a downhole motor and/or via rotation of the drill string 210 from the well surface. Without limitation, the drill bit 216 may include, roller cone bits, PDC bits, natural diamond bits, any hole openers, reamers, coring bits, and the like. As the drill bit 216 rotates, it may create a wellbore 218 that penetrates various subterranean formations 220.

The drilling assembly 200 may further include the fluid monitoring and handling system 100 as generally described herein. The mud pump 116 of the fluid monitoring and handling system 100 representatively includes any conduits, pipelines, trucks, tubulars, and/or pipes used to fluidically convey the drilling fluid 222 downhole, any pumps, compressors, or motors (e.g., topside or downhole) used to drive the drilling fluid 222 into motion, any valves or related joints used to regulate the pressure or flow rate of the drilling fluid 222, and any sensors (e.g., pressure, temperature, flow rate, etc.), gauges, and/or combinations thereof, and the like.

The mud pump 116 may circulate the drilling fluid 222 through a feed pipe 224 and to the kelly 212, which conveys the drilling fluid 222 downhole through the interior of the drill string 210 and through one or more orifices in the drill bit 216. The drilling fluid 222 may then be circulated back to the surface via an annulus 226 defined between the drill string 210 and the walls of the wellbore 218. At the surface, the recirculated or spent drilling fluid 222 may be conveyed to the fluid reconditioning system 122 via a circulated drilling fluid return line 136. After passing through the fluid reconditioning system 122, a "cleaned" drilling fluid 222 may be deposited into a nearby mud pit 102. While illustrated as being arranged at the outlet of the wellbore 218 via the annulus 226, those skilled in the art will readily appreciate that the fluid reconditioning system 122 may be arranged at any other location in the drilling assembly 200 to facilitate its proper function, without departing from the scope of the disclosure.

Referring still to FIG. 2, the fluid monitoring and handling system 100 may further include the fluid analysis system 104, which may be disposed on a skid supported on the drilling platform 204. The fluid analysis system 104 may, for example, continuously or intermittently measure the concentration of the drilling fluid 222. As illustrated, the drilling fluid 222 may be taken from the mud pit 102 via the mud pit line 106 and an analyzed drilling fluid may be returned to the mud pit 102 via the return line 108. Alternatively, the concentration of the drilling fluid 222 may be measured, recorded, and/or analyzed at fluid reconditioning system 122, or at any other suitable location, even while in the wellbore 218 if desired.

Thus, the fluid monitoring and handling system 100 may advantageously monitor the concentration of one or more drilling fluid additives using the example methods disclosed herein. The fluid monitoring and handling system 100 may also generate automatic warnings to the personnel when the concentrations deviate from preset safety margins and/or automatically add additional amounts of the one or more drilling fluid additives to the drilling fluid when the concentrations deviate from preset safety margins.

In addition to quantification of drilling fluid additives, the chemical tagging of drilling fluid additives may enable improved distinction between formation fluids and drilling fluid additives. Subterranean formations can often include complex mixtures of aliphatic hydrocarbons, aromatics, hetero-atomic molecules, anionic and cationic salts, acids, sands, silts, clays, and a vast array of other components. A produced formation fluid may include a mixture of any number of the fluids present in the formation as well as chemicals and fluids that were introduced into the formation during the drilling phase. In many instances it may be advantageous to take samples of a produced fluid to test it for various properties. The samples may be taken from produced fluids at the surface or taken directly from the subterranean formations using specialized equipment. Some properties tested may have an effect on engineering, economic, and design of equipment and production. Some conclusions that may be drawn from well samples may include design of production facilities, compatibility with pipeline transport, product sales value, and reservoir asset values.

However, the fluids and chemicals introduced into the formation during drilling may interfere with the testing done on the produced reservoir fluids such as oil. Testing results from produced reservoir fluids contaminated with drilling fluid additives may produce skewed results. Oftentimes the drilling fluid additives do not easily separate from the produced fluids and the signals produced by the drilling fluid additives are not easily distinguished from the signals produced by the reservoir fluids. However, by chemical tagging, the drilling fluid additives may be distinguished from the reservoir fluids.

Methods may include circulating a drilling fluid including the chemically-tagged drilling fluid additive in a wellbore while drilling. Testing equipment such as downhole, surface, and real-time equipment as well as computer models may examine and quantify the chemically-tagged drilling fluid additives and exclude their contribution from the analysis of reservoir fluids. As used herein, the term reservoir fluids may be any fluids that are originally present in the formation. The chemically tagged drilling fluid additive may have contaminated fluids in the wellbore including the reservoir fluids thereby hindering or distorting data gathered from tests on the produced reservoir fluid. The amount of chemically tagged drilling fluid additive in a sample of produced reservoir fluid may be quantified by measuring the signal produced by the characteristic tagging material. With the knowledge of the amount of chemically tagged drilling fluid additive present in the sample, the signal the chemically-tagged drilling fluid produces in other tests, such as, for example, a spectrographic test may be subtracted out from the signal the total sample of produced reservoir fluid to arrive at a signal without the noise or contribution from the chemically-tagged drilling fluid. In another example, the characteristic tagging material may move the spectral signal, or other signals being measured, such that it no longer overlaps with the spectral signal, or other signal, from the reservoir fluid. In some examples, multiple chemically-tagged drilling fluid additives may be included in a drilling fluid each with a unique or the same characteristic tagging material. In such examples, the contribution of each chemically tagged drilling fluid additive may be quantified and removed from the final signal. The methodology may be applied to any fluids that have contacted the chemically-tagged drilling fluid additive in the wellbore such as the drilling fluid itself or any other fluids present in the wellbore, near wellbore region, or formation.

Figure 3:
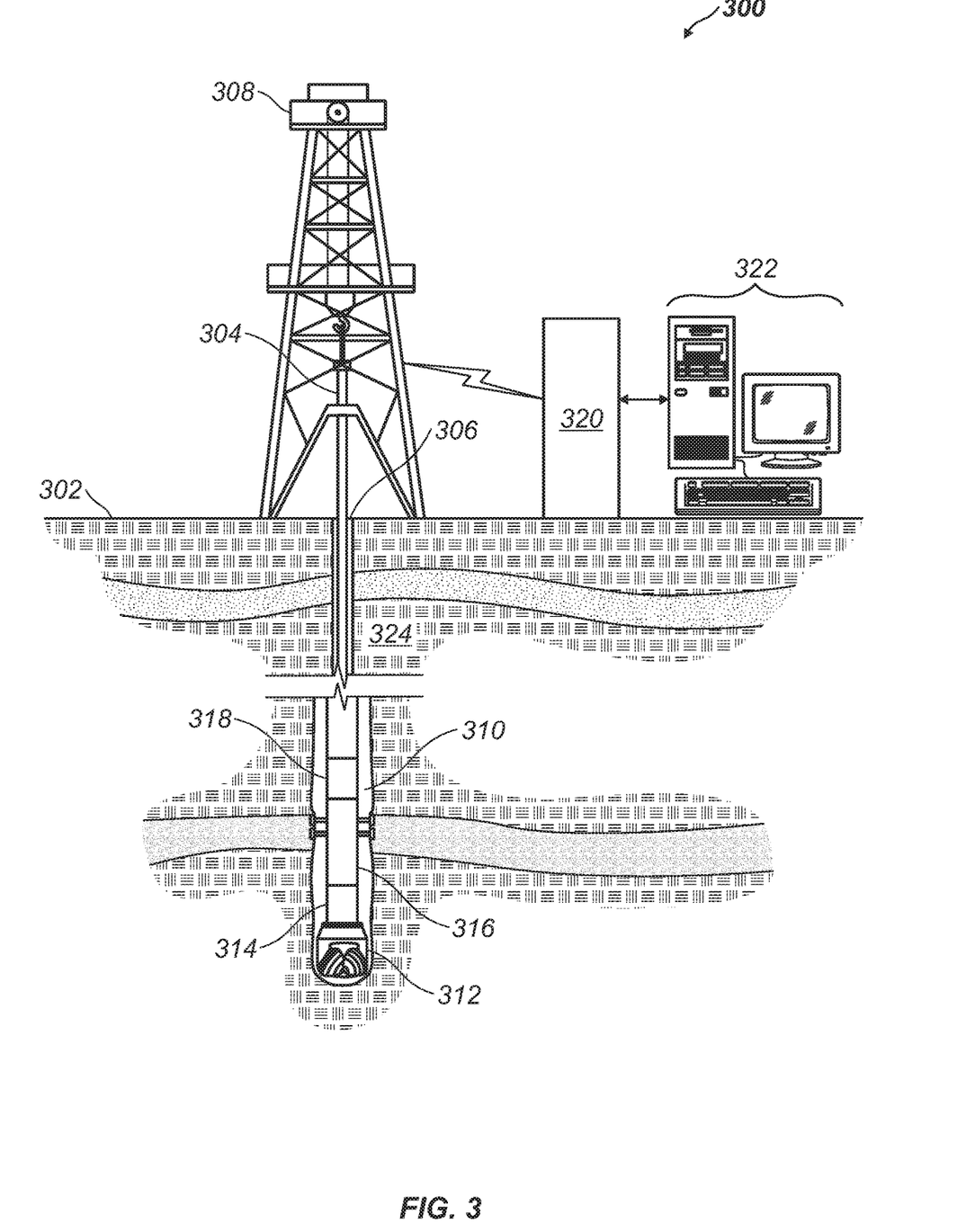
FIG. 3 illustrates an example environment in which a formation testing tool may be utilized.

FIG. 3 illustrates an example environment 300 that may be used for obtaining a sample of a formation fluid. As illustrated, the environment 300 may include a derrick 308 positioned on surface 302 from which a drill string 304 is suspended in a borehole 306 positioned in subterranean formation 324. The volume within the borehole 306 around the drill string 304 may be the annulus 310. The drill string 304 may include a drill bit 312, a variety of actuators and sensors, shown schematically by element 314, a formation testing tool 316 and a telemetry section 318, through which the downhole equipment communicates with a surface telemetry system 320. A computer 322 may include input/output devices, memory, storage, and network communication equipment, including equipment necessary to connect to the Internet, receive data from the downhole equipment and send commands to the downhole equipment. It should be noted that although FIG. 3 illustrates formation testing tool 316 on a drill string 304, formation testing tool 316 may also be utilized on other suitable conveyances, such as, a wireline (shown on FIG. 4). For example, the equipment and techniques described herein may also be useful in a wireline or slickline environment. For example, the formation testing tool 316 may be lowered into the borehole 306 using wired drill pipe, wireline, coiled tubing (wired or unwired), or slickline. Formation testing tool 316 may then take a sample of the formation fluid.

In a measurement-while-drilling or logging-while-drilling environment, such as that shown in FIG. 3, power for the formation testing tool 316 may be provided by a battery, by a mud turbine, or through a wired pipe from the surface, or through some other conventional means. In a wireline or slickline environment, power may be provided by a battery or by power provided from the surface through the wired drill pipe, wireline, coiled tubing, or slickline, or through some other conventional means.

In certain systems and methods, the drilling equipment may not be on dry land, as shown in FIG. 3 but may be on a wetland or at sea. In such an environment, the derrick 308 (or another piece of equipment that performs the function of the derrick) may be located on a drilling platform, such as a semi-submersible drilling rig, a drill ship, or a jack-up drilling rig. The drill string 304 may extend from the derrick 308 through the water, to the sea floor, and into the subterranean formation 324.

Referring to FIG. 3, the formation testing tool 316 may include a power telemetry section (not shown) through which the formation testing tool 316 may communicate with other actuators and sensors 314 in the drill string 304, the drill string's telemetry section 318, and/or directly with the surface telemetry system 320. In one embodiment, the power telemetry section (not shown) may also be the port through which the various actuators (e.g. valves) and sensors (e.g., temperature and pressure sensors) in the formation testing tool 316 may be controlled and monitored. The power telemetry section (not shown) may include a computer that may exercise control and monitoring functions. The control and monitoring functions may be performed by a computer in another part of the drill string (not shown) or by the computer 322 on the surface.

The formation testing tool 316 may include a formation probe section (not shown), which may extract a sample of the formation fluid. The formation fluid sample may include chemically tagged drilling fluid additives. Formation testing tool 316 may take samples of the formation fluid directly in the subterranean formation. The sample of the formation fluid may then be sent to the surface for testing or may be tested directly in the subterranean formation using specialized equipment. The formation fluid may be tested for various properties. The sample may be analyzed to distinguish the formation fluid from the chemically tagged drilling fluid additives. This may be done by measuring the signal produced by the characteristic tagging material and then accounting for those signals in later tests. Any suitable technique may be used to analyze the signal produced by the characteristic tagging material. In a non-limiting example, the amount of chemically tagged drilling fluid additive present in the sample and the signal it produces in other tests may be known. A spectrographic test accounting for the signal produced by the chemically tagged drilling fluid additive may be subtracted out from the signal produced by the total sample of formation fluid. This would allow the formation fluid to be tested without the noise produced by the chemically tagged drilling fluid additive. This may allow for more accurate measurements of the formation fluid, as the test accounts for the noise produced by the chemically tagged drilling fluid additive. Tests on the sample may be performed at the surface or in the subterranean formation. Tests on the sample may be performed using specialized equipment described above and computer 322 or they may be done manually.

Figure 4:
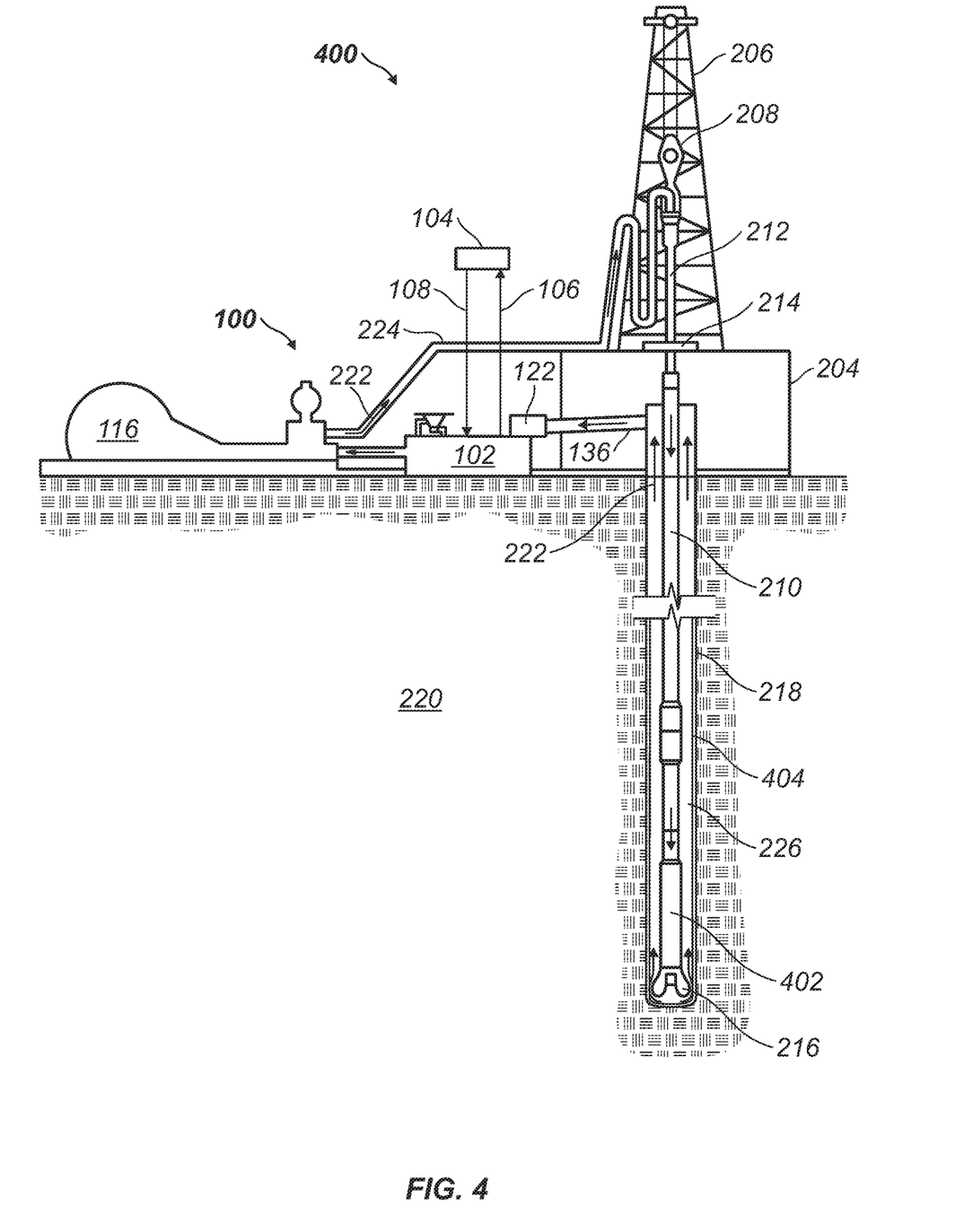
FIG. 4 illustrates an example of a drilling assembly that may employ the fluid monitoring and handling system of FIG. 1 to determine concentration of one or more drilling fluid additives particularly for lost circulation materials.

FIG. 4 illustrates an example of a drilling assembly 400 that may employ the fluid monitoring and handling system 100 of FIG. 1 described herein to determine concentration of one or more drilling fluid additives. In a non-limiting example, the drilling fluid additives may be lost circulation materials. It should be noted that while FIG. 4 generally depicts a land-based drilling system, those skilled in the art will readily recognize that the principles described herein are equally applicable to subsea drilling operations that employ floating or sea-based platforms and rigs, without departing from the scope of the disclosure.

As illustrated, the drilling assembly 400 may include a drilling platform 204 that supports a derrick 206 having a traveling block 408 for raising and lowering a drill string 210. The drill string 210 (referring to FIG. 2) may include, but is not limited to, drill pipe and coiled tubing, as generally known to those skilled in the art. A kelly 212 may support the drill string 210 as it may be lowered through a rotary table 414. A downhole tool 416 may be attached to the distal end of the drill string 210. As will be discussed in more detail below, downhole tool 416 may be used for monitoring chemically tagged drilling fluid additives in wellbore 218.

The drilling assembly 400 may further include the fluid monitoring and handling system 100 as generally described herein. The mud pump 116 of the fluid monitoring and handling system 100 representatively includes any conduits, pipelines, trucks, tubulars, and/or pipes used to fluidically convey the drilling fluid 222 downhole, any pumps, compressors, or motors (e.g., topside or downhole) used to drive the drilling fluid 222 into motion, any valves or related joints used to regulate the pressure or flow rate of the drilling fluid 222, and any sensors (e.g., pressure, temperature, flow rate, etc.), gauges, and/or combinations thereof, and the like. Drilling fluid 222 may include any suitable additive. In some example, the additive may be a lost circulation material(or other suitable drilling fluid additive) that may be chemically tagged. The lost circulation material may be tagged in any suitable manner as discussed above. As previously described, the lost circulation material may be fluorescently tagged. Any suitable lost circulation material may be used.

The lost circulation material may form a filter cake 404. Filter cake 404 may prevent fluid loss to subterranean formation 220. The fluid monitoring and handling system 100 may monitor the amount of fluorescently tagged lost circulation material present in drilling fluid 222. Knowing the amount of fluorescently tagged lost circulation material originally placed in the drilling fluid, the amount of lost circulation material being lost in the formation may be determined. Furthermore, downhole tool 402 may take measurements in wellbore 218. These measurements may include the amount of chemically tagged additives in the mud. The amount of chemically tagged additives may determine the amount of drilling fluid additives, such as lost circulation materials, still in the mud. This information may be used to produce a visual representation (e.g., an image) of the chemically tagged drilling fluid additive in the subterranean formation or a filter cake. Additionally, the amount of drilling fluid additives, such as lost circulation materials, in the wellbore wall may be measured. This may produce an image and it may help determine the amount of drilling fluid additive used. These measurements may be processed to generate information corresponding to of the chemically drilling fluid additives in the filter cake 404 and/or in the subterranean formation 220. This information may include, for example, an image representative of the chemically tagged lost circulation materials in the filter cake 404. The processing may occur downhole, at the surface, or a combination thereof.

The mud pump 116 may circulate may circulate the drilling fluid 222 through a feed pipe 224 and to the kelly 212, which conveys the drilling fluid 222 downhole through the interior of the drill string 210 and through one or more orifices in the drill bit 216. The drilling fluid 222 may then be circulated back to the surface via an annulus 226 defined between the drill string 210 and the walls of the wellbore 218. At the surface, the recirculated or spent drilling fluid 222 may be conveyed to the fluid reconditioning system 122 via a circulated drilling fluid return line 136. After passing through the fluid reconditioning system 122, a "cleaned" drilling fluid 222 may be deposited into a nearby mud pit 102. While illustrated as being arranged at the outlet of the wellbore 218 via the annulus 226, those skilled in the art will readily appreciate that the fluid reconditioning system 122 may be arranged at any other location in the drilling assembly 400 to facilitate its proper function, without departing from the scope of the scope of the disclosure.

Referring still to FIG. 4, the fluid monitoring and handling system 100 may further include the fluid analysis system 104, which may be disposed on a skid supported on the drilling platform 204. The fluid analysis system 104 may, for example, continuously or intermittently measure the concentration of drilling fluid 222, and subsequently the amount of lost circulation material being lost. As illustrated, the drilling fluid 222 may be taken from the mud pit 102 via the mud pit line 106 and an analyzed drilling fluid may be returned to the mud pit 102 via the return line 108. Alternatively, the concentration of the drilling fluid 222 may be measured, recorded, and/or analyzed at fluid reconditioning system 122, or at any other suitable location, even while in the wellbore 218 if desired. In some examples, the concentration of drilling fluid 222 may be measured, recorded, and/or analyzed at the surface of the wellbore, in real time, in a bench top tool, and/or the like. These measurements, along with known values, may be sent to a device that may produce an image of the lost circulation material present in the subterranean formation based on the information received.

Figure 5:
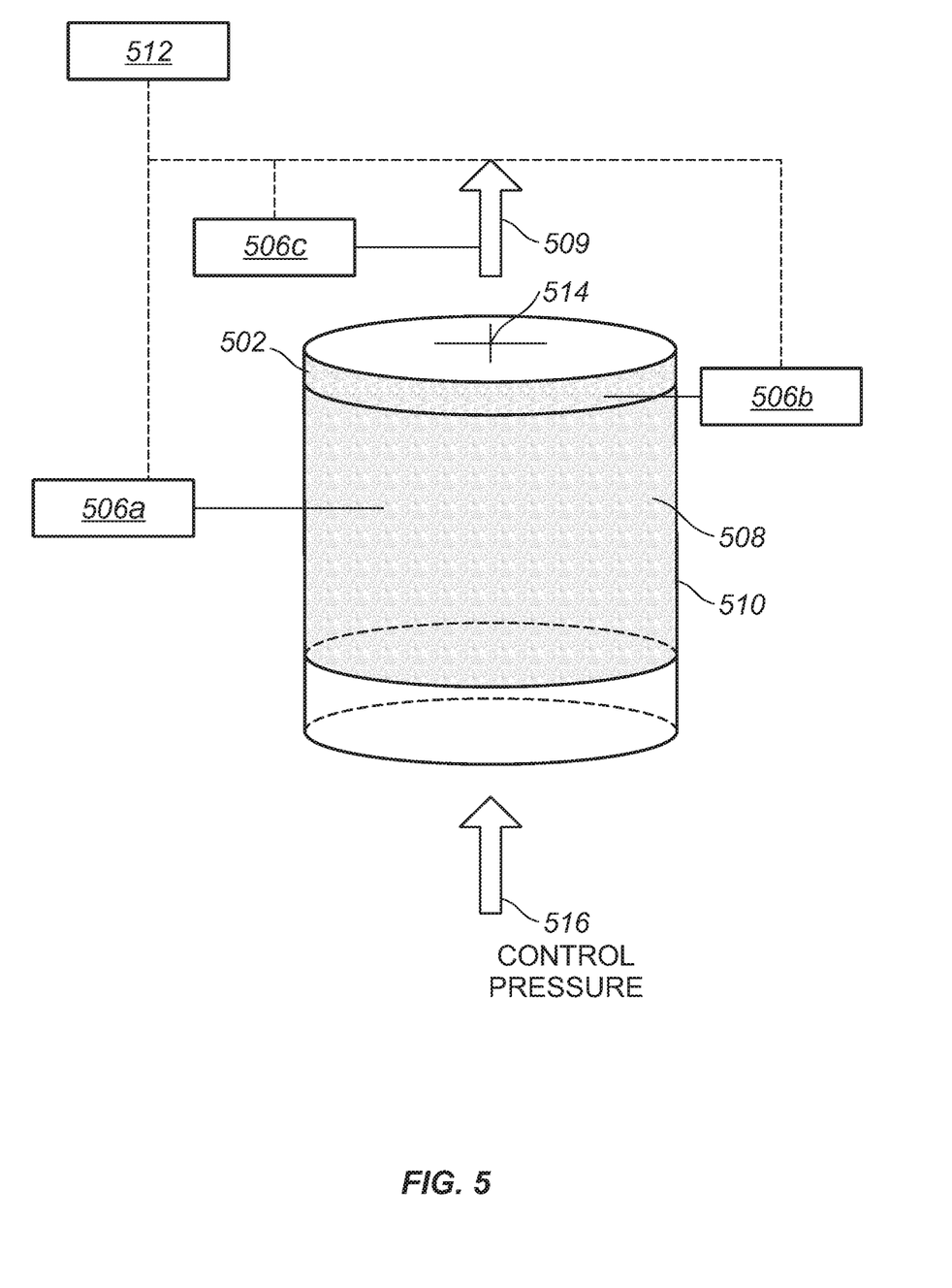
FIG. 5 illustrates an apparatus that may be used to evaluate chemically tagged drilling fluid additives.

FIG. 5 illustrates an example of an apparatus 500 that may be used to evaluate chemically tagged lost circulation materials. Apparatus 500 may be used onsite or offsite in a lab. Any suitable chemically tagged drilling fluid additive, such as a chemically tagged lost circulation material, may be used to produce test filter cake 502 in the wellbore. Any suitable method may be used to chemically tag drilling fluid additive. In a non-limiting example, the lost circulation material may be fluorescently tagged. For ease of illustration, apparatus 500 is generally illustrated as a collective of its component parts. Any apparatus 500 may be used. The apparatus 500 may include a single unit wherein all of the component pieces may be disposed within or about the single unit. Alternatively, apparatus 500 may be formed from individual modules including one or more of the components of apparatus 500 that are connected in a manner sufficient to form a functioning apparatus 500.

Apparatus 500 may include a variety of sensors 506a-506c. The sensors 506a may be collectively referred to as sensors 506a-506c and individually referred to as mud sensor 506a, cake sensor 506b, and outlet sensor 506c. Any suitable sensors 506a-506c for fluorescently tagged drilling fluid additives may be used, including, but not limited to, a charge couple device and light detectors, such as a photo-multiplier tube or a photodetector. Sensors 506a-506c may be used to take a plurality of measurements at different locations. Mud sensor 506a may be used to measure the concentration of chemically tagged drilling fluid additive in a sample drilling fluid 508 disposed in vessel 510. Any suitable sample drilling fluid 508 may be tested. Cake sensor 506b may be used to measure the concentration of chemically tagged drilling fluid additives in test filter cake 502. Outlet sensor 506c may be used to measure the concentration of chemically tagged drilling fluid additive in filtrate 509 that exits vessel 510 after it passes through test filter cake 502 and opening 514. The sensor measurements may then be sent to any device capable of processing the data 512. In a non-limiting example, a device capable of processing the data 512 may include a computer, a tablet, a mobile device, and/or any combination thereof.

In a non-limiting example, sample drilling fluid 508 may be placed inside a vessel 510. Any suitable vessel 510 may be used. Vessel 510 may have an opening 514 in a filter media. Suitable filter media may include, but it is not limited to, a disc with opening 514 or a filter disc. The filter disc may have a range of about 10 microns to about 10,000 microns, or from about 10 microns to about 1,000 microns, or from about 100 microns to about 5,000 microns. The sample drilling fluid 508 may be placed inside vessel 510. Pressure 516 may be applied to sample drilling fluid 508 to force sample drilling fluid 508 through opening 514. While the sample drilling fluid 508 is being forced through opening 514, test filter cake 502 may be formed. The test filter cake 502 may represent the filter cake that is currently being formed in the wellbore from which sample drilling fluid 508 came. Opening 514 may be of any suitable size or shape. Drilling fluid additives, such as chemically tagged lost circulation materials or other chemically tagged drilling additives, from sample drilling fluid 508 may lost to teste filter cake 502. The concentration of chemically tagged drilling fluid additives in sample drilling fluid 508 by mud sensor 506, in sample filter cake 502 by cake sensor 506b, and in filtrate 509 by outlet sensor 506c may then be monitor over time and sent to a device capable of processing the data 512. The processed data may then be analyzed. The analyzed data may be used for example, to evaluate the chemically tagged drilling fluid additives and their effectiveness in filter cake formation. The analyzed data may then be sent to the drill site from which the sample drilling fluid 508 came. Adjustments may then be made to the drilling fluid based on the analyzed data. The analyzed data may be also be used to adjust the lost circulation material(s) or quantifies there for use in formulating a drilling fluid to be used at a well site.

Accordingly, this disclosure describes methods, systems, and apparatuses that may use chemically tagged drilling fluid additives in cementing operations. The methods, systems, and apparatuses may include any of the following statements:

Statement 1. A method including: circulating a drilling fluid in a wellbore, wherein the drilling fluid includes a chemically tagged drilling fluid additive; and extending the wellbore into one or more subterranean formations while circulating the drilling fluid.

Statement 2. The method of statement 1, wherein the chemically tagged drilling fluid additive includes a drilling fluid additive and a chemical tag bonded to molecules of the drilling fluid additive, wherein the chemical tag includes at least one tag selected from the group of fluorescent molecules and a chemical isotope.

Statement 3. The method of statement 2, wherein the chemical tag is covalently bonded to molecules of the drilling fluid additive.

Statement 4. The method of any of the preceding statements, wherein the chemically tagged drilling fluid additive includes a chemical tag in an amount ranging from about 0.0001 mol % to about 10 mol % based on total moles of the chemically tagged drilling fluid additive.

Statement 5. The method of any of the preceding statements, wherein the chemically tagged drilling fluid additive includes at least one drilling fluid additive selected from the group consisting of a lost circulation material, a base oil, a shale inhibitor, a lubricant, and any combination thereof.

Statement 6. The method of any of the preceding statements, further including taking a sample of a formation fluid, wherein the sample of the formation fluid is contaminated with a quantity of the chemically tagged drilling additive; quantifying concentration of the chemically tagged drilling fluid additive in the sample; and at least partially excluding the concentration of the chemically tagged drilling fluid additive from analysis of the sample of the formation fluid.

Statement 7. The method of any of the preceding statements, wherein taking a sample of a formation fluid includes running a formation testing tool into the wellbore and recovering the sample of the formation fluid into the formation testing tool.

Statement 8. The method of any of the preceding statements, wherein the quantifying includes ultraviolet spectroscopy.

Statement 9. The method of any of the preceding statements, further including taking a sample of the drilling fluid; determining a concentration of the chemically tagged drilling fluid additive in the sample of the drilling fluid; and adjusting a composition of the drilling based at least partially on the concentration of the chemically tagged drilling fluid additive.

Statement 10. The method of any of the preceding statements, wherein the determining the concentration includes ultraviolet spectroscopy.

Statement 11. The method of any of the preceding statements, wherein the chemically tagged drilling fluid additive includes lost circulation materials with different particles sizes, wherein the different particle sizes of the lost circulation materials are chemically tagged with a different flurophore, wherein each flurophore emits a different wavelength of light.

Statement 12. The method of any of the preceding statements, wherein the chemically tagged drilling fluid additive includes different drilling fluid additives that each have chemical tags that are orthogonal to one another.

Statement 13. The method of any of the preceding statements, further including lowering a downhole tool on a drill string into the wellbore, taking fluoroscopic measurements in the wellbore with the downhole tool, and analyzing the fluoroscope measurements to obtain a visual representation of the chemically tagged drilling fluid additive that is in a filter cake or in the subterranean formation.

Statement 14. The method of any of the preceding statements, wherein the chemically tagged drilling fluid additive includes a lost circulation material and fluorescent molecules attached to molecules of the lost circulation material, wherein the lost circulation material includes lost circulation materials with different particles sizes, wherein the different particle sizes of the lost circulation materials are chemically tagged with a different flurophore, wherein each flurophore emits a different wavelength of light, wherein the method further includes taking fluoroscopic measurements of at least a portion of the drilling fluid to quantify the amount of the chemically tagged drilling fluid additive in the drilling fluid and adjusting a composition of the drilling based at least partially on the quantification of the chemically tagged drilling fluid additive.

Statement 15. A system including: a drilling fluid including a chemically tagged drilling fluid additive; a drill string includes a drill bit and a downhole tool; a data processing system operable to receive measurements from the downhole tool to produce a visual representation of the chemically tagged drilling fluid additive in a subterranean formation or a filter cake.

Statement 16. The system of statement 15, wherein the downhole tool includes a fluorescence analyzer.

Statement 17. The system of statements 15 or 16, wherein the chemically tagged drilling fluid additive includes a drilling fluid additive and a chemical tag bonded to molecules of the drilling fluid additive.

Statement 18. The system of any one of statements 15 to 17, wherein the chemical tag is covalently bonded to molecules of the drilling fluid additive.

Statement 19. An apparatus including: a vessel for holding a quantity of a drilling fluid a filter media disposed in the vessel, wherein the filter media including at least one opening; a mud sensor positioned to measure a first concentration of a chemically tagged drilling fluid additive in the drilling fluid; a cake sensor positioned to measure a second concentration of the chemically tagged drilling fluid additive in a filter cake formed on the filter media; an outlet sensor positioned to measure a third concentration of the chemically tagged drilling fluid additive in a filter cake formed on the filter media; and a data processing system coupled to the mud sensor, the cake sensor, and the outlet sensor.

Statement 20. The apparatus of statement 19, wherein the cake sensor, the outlet sensor, and the outlet sensor each include a light detector.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

Although the present invention and its advantages have been described in detail, it should be understood that various changes, substitutions and alterations may be made herein without departing from the spirit and scope of the invention as defined by the appended claims.

What is claimed is:

1. A method comprising:
    circulating a drilling fluid in a wellbore, wherein the drilling fluid comprises a chemically tagged drilling fluid additives, wherein the chemically tagged drilling fluid additives are each orthogonally tagged with a different flurophore, wherein each flurophore emits a different wavelength of light and wherein the chemically tagged drilling fluid additives each comprise a different drilling fluid additive; and
    extending the wellbore into one or more subterranean formations while circulating the drilling fluid.

2. The method of claim 1, wherein the chemically tagged drilling fluid additives comprise a drilling fluid additive and a chemical tag bonded to molecules of the drilling fluid additive, wherein the chemical tag comprises at least one tag selected from the group of fluorescent molecules and a chemical isotope.

3. The method of claim 2, wherein the chemical tag is covalently bonded to molecules of the drilling fluid additive.

4. The method of claim 1, wherein the chemically tagged drilling fluid additives comprises a chemical tag in an amount ranging from about 0.0001 mol % to about 10 mol % based on total moles of the chemically tagged drilling fluid additive.

5. The method of claim 1, wherein the chemically tagged drilling fluid additives comprise at least one drilling fluid additive selected from the group consisting of a lost circulation material, a base oil, a shale inhibitor, a lubricant, and any combination thereof.

6. The method of claim 1, further comprising taking a sample of a formation fluid, wherein the sample of the formation fluid is contaminated with a quantity of the chemically tagged drilling additives; quantifying concentration of the chemically tagged drilling fluid additives in the sample; and at least partially excluding the concentration of the chemically tagged drilling fluid additives from analysis of the sample of the formation fluid.

7. The method of claim 6, wherein taking a sample of a formation fluid comprises running a formation testing tool into the wellbore and recovering the sample of the formation fluid into the formation testing tool.

8. The method of claim 7, wherein the quantifying comprises ultraviolet spectroscopy.

9. The method of claim 1, further comprising: taking a sample of the drilling fluid; determining a concentration of the chemically tagged drilling fluid additive in the sample of the drilling fluid; and adjusting a composition of the drilling based at least partially on the concentration of the chemically tagged drilling fluid additives.

10. The method of claim 9, wherein the determining the concentration comprises ultraviolet spectroscopy.

11. The method of claim 9, wherein the chemically tagged drilling fluid additives comprises lost circulation materials with different particles sizes, wherein the different particle sizes of the lost circulation materials are chemically tagged with a different flurophore, wherein each flurophore emits a different wavelength of light.

12. The method of claim 1, further comprising lowering a downhole tool on a drill string into the wellbore, taking fluoroscopic measurements in the wellbore with the downhole tool, and analyzing the fluoroscope measurements to obtain a visual representation of the chemically tagged drilling fluid additives that is in a filter cake or in the subterranean formation.

13. The method of claim 1, wherein the chemically tagged drilling fluid additives comprise a lost circulation material and fluorescent molecules attached to molecules of the lost circulation material, wherein the lost circulation material comprises lost circulation materials with different particles sizes, wherein the different particle sizes of the lost circulation materials are chemically tagged with a different flurophore, wherein each flurophore emits a different wavelength of light, wherein the method further comprises taking fluoroscopic measurements of at least a portion of the drilling fluid to quantify the amount of the chemically tagged drilling fluid additives in the drilling fluid and adjusting a composition of the drilling based at least partially on the quantification of the chemically tagged drilling fluid additives.

14. A system comprising:
    a drilling fluid comprising a chemically tagged drilling fluid additive;
    a drill string comprises a drill bit and a downhole tool;
    a data processing system operable to receive measurements from the downhole tool to produce a visual representation of the chemically tagged drilling fluid additive in a subterranean formation or a filter cake, wherein the visual representation comprises an image representation of lost circulation materials including the chemically tagged drilling fluid additive in the filter cake.

15. The system of claim 14, wherein the downhole tool comprises a fluorescence analyzer.

16. The system of claim 14, wherein the chemically tagged drilling fluid additive comprises a drilling fluid additive and a chemical tag bonded to molecules of the drilling fluid additive.

17. The system of claim 16, wherein the chemical tag is covalently bonded to molecules of the drilling fluid additive.

18. An apparatus comprising:
    a vessel for holding a quantity of a drilling fluid
    a filter media disposed in the vessel, wherein the filter media comprising at least one opening;
    a mud sensor positioned to measure a first concentration of a chemically tagged drilling fluid additive in the drilling fluid;
    a cake sensor positioned to measure a second concentration of the chemically tagged drilling fluid additive in a filter cake formed on the filter media;
    an outlet sensor positioned to measure a third concentration of the chemically tagged drilling fluid additive in a filter cake formed on the filter media; and
    a data processing system coupled to the mud sensor, the cake sensor, and the outlet sensor.

19. The apparatus of claim 18, wherein the cake sensor, the outlet sensor, and the outlet sensor each comprise a light detector.

20. A method comprising:
    circulating a drilling fluid in a wellbore, wherein the drilling fluid comprises a chemically tagged drilling fluid additive, wherein the chemically tagged drilling fluid additive comprises lost circulation materials with different particles sizes, wherein the different particle sizes of the lost circulation materials are chemically tagged with a different flurophore, wherein each flurophore emits a different wavelength of light; and extending the wellbore into one or more subterranean formations while circulating the drilling fluid.

21. A method comprising:

circulating a drilling fluid in a wellbore, wherein the drilling fluid comprises a chemically tagged drilling fluid additive wherein the chemically tagged drilling fluid additive comprises a lost circulation material and fluorescent molecules attached to molecules of the lost circulation material, wherein the lost circulation material comprises lost circulation materials with different particles sizes, wherein the different particle sizes of the lost circulation materials are chemically tagged with a different flurophore, wherein each flurophore emits a different wavelength of light, wherein the method further comprises taking fluoroscopic measurements of at least a portion of the drilling fluid to quantify the amount of the chemically tagged drilling fluid additive in the drilling fluid and adjusting a composition of the drilling based at least partially on the quantification of the chemically tagged drilling fluid additive; and extending the wellbore into one or more subterranean formations while circulating the drilling fluid.

\* \* \* \* \*

UNITED STATES PATENT AND TRADEMARK OFFICE
CERTIFICATE OF CORRECTION

PATENT NO. : 10,934,835 B2
APPLICATION NO. : 16/480636
DATED : March 2, 2021
INVENTOR(S) : Jay Paul Deville et al.

Page 1 of 1

It is certified that error appears in the above-identified patent and that said Letters Patent is hereby corrected as shown below:

In the Claims

Column 21 Line 37, Claim 4 from "additive" to --additives--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*